Oct. 25, 1927.
R. H. ROSENBERG
1,646,932
WHEEL BRAKE
Filed Jan. 27, 1925
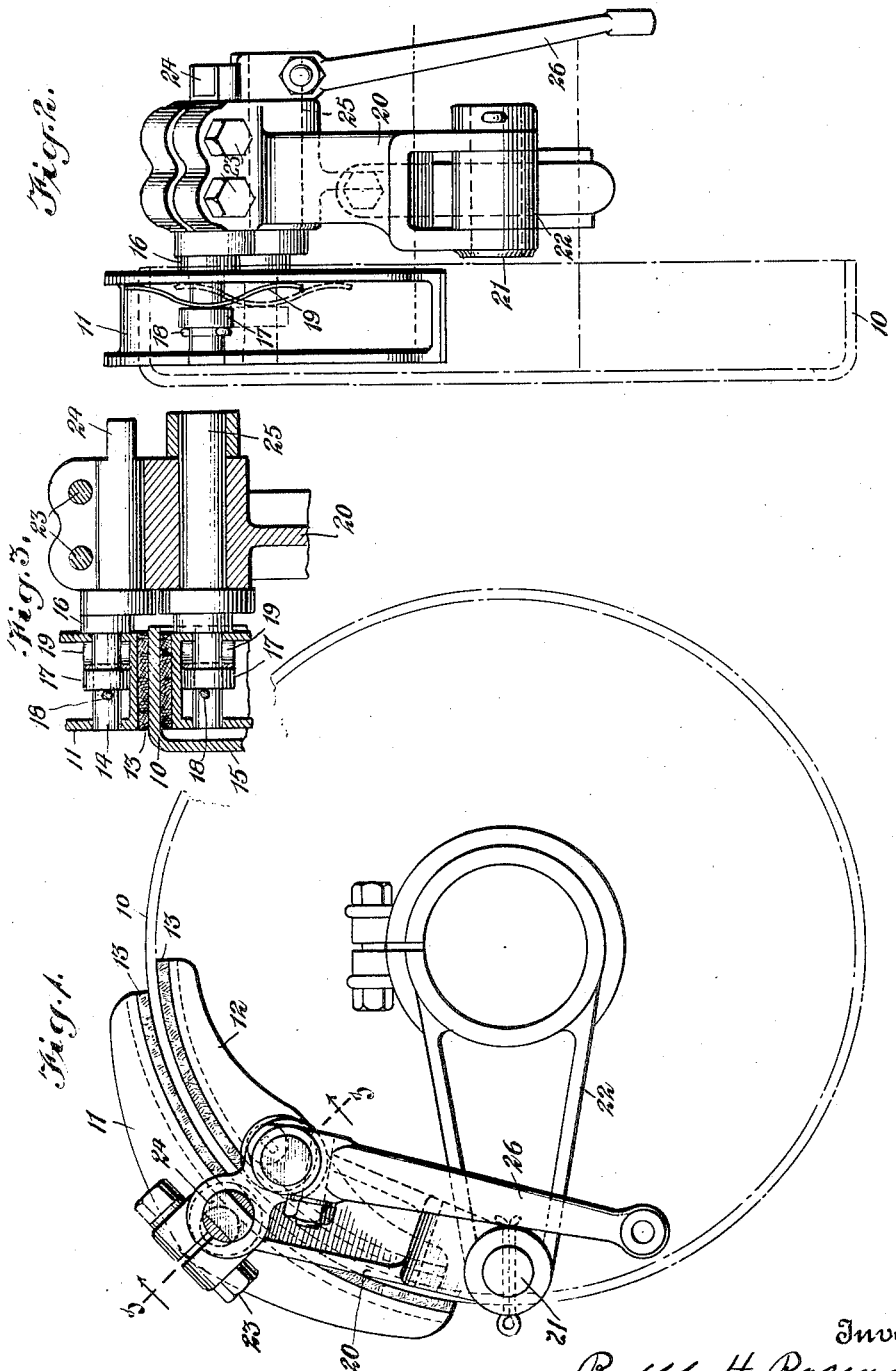
Inventor
Ralph H Rosenberg
By his Attorneys
Dean, Fairbank, Albright & Hirsch Patented Oct. 25, 1927.

1,646,932

UNITED STATES PATENT OFFICE

RALPH H. ROSENBERG, OF SYRACUSE, NEW YORK, ASSIGNOR TO AMERICAN CABLE COMPANY, INC.

WHEEL BRAKE.

Application filed January 27, 1925. Serial No. 4,988.

This invention is an improvement in brakes for wheels or other rotary members and is of that type in which there are a pair of brake shoes which may be operated to grip an annular part of the rotor therebetween.

As one important feature the brake shoes are so mounted that when in either braking or released position they may float in a direction at an angle to the rotor surface, and thereby permit uniform braking action and prevent binding in case the rotor surface departs from true circular form due to lack of truing operation during manufacture or assembly, or due to expansion or contraction on changes in temperature.

As a further feature the brake shoes are so designed that when engaged they leave the major portion of the brake rotor surface exposed for heat radiation so that the liability of overheating or burning the brake linings during long continued application of the brakes is reduced to a minimum. The ends of the brake shoes also act as scrapers to remove any mud or other foreign matter that may splash or drip on the exposed rotor surface. This arrangement also permits two independently operable pairs of brakes to be mounted for engagement with a single rotor.

As another important feature the operating mechanism is directly connected to one only of the pair of shoes, the support for the two shoes being so designed and mounted that the two shoes are applied or released simultaneously.

As a further feature the parts are so mounted that in case of wear of the brake shoe linings one only of the brake shoes need be readjusted to compensate for change in the thickness of the linings of both shoes.

As a further feature the parts are so designed that changes in the length or position of the operating rod or other mechanism connected to one brake shoe may be compensated for by merely adjusting the position of the other shoe.

One important object of my invention is to provide a construction whereby I can secure the foregoing advantages by the use of the minimum number of parts, simple in design, inexpensive to manufacture and assemble, certain and positive in operation, easy to adjust, and easy and inexpensive to reline or repair.

My improved construction may be employed for controlling rotors in various types of apparatus, and operates equally efficiently both as to braking and release, irrespective of the direction of rotation of the rotor. The rotor may have its brake surface in a radial plane with the brake shoes axially movable upon opposite sides thereof, or it may be in the form of the more usual cylindrical drum with one shoe at the outer surface and the other at the inner surface, and both movable in a direction having a radial component.

The two shoes are preferably pivotally mounted upon pins journaled in a pivoted arm and upon opposite sides of the rotor brake surface. Thus the arm may swing to insure simultaneous and equal action by both shoes upon the required movement of either shoe toward the other. Each pin preferably has the portion journaled in the arm and the portion journaled in the shoe eccentrally disposed in respect to each other, whereby upon the rotation of either pin the shoes are given a relative movement toward or away from each other. Preferably one pin is rotatable to secure the desired normal spacing and is normally locked against rotation, while the other is rotated by the operating mechanism to apply or release the brake.

In the accompanying drawing I have shown one embodiment of my invention, but of course it will be obvious that many changes may be made in the details of construction within the spirit of my invention without departing from the scope, as defined in the appended claims. The drawings are to be considered in an illustrative rather than in a limiting sense.

In these drawings:

Fig. 1 is an end elevation showing the rotor in dot and dash lines.

Fig. 2 is a face elevation, and

Fig. 3 is a transverse section on the line 3—3 of Fig. 1.

I have illustrated my invention in a form adapted for use in connection with a rotor in the form of a brake drum with a substantially cylindrical peripheral wall 10 presenting opposed inner and outer surfaces for the engagement of the brake shoes. Two brake shoes 11 and 12 are employed and are mounted for engagement with the opposite surfaces of the brake drum. The shoes have their surfaces substantially parallel and of approximately the same curvature as that of the wall 10. The shoes may be made from castings, stampings or in any other suitable manner, and are provided with linings 13 which may be held in place in any suitable manner and may be of the same general type as is commonly employed for this purpose. The two shoes are pivotally mounted upon a pair of pins which are disposed upon opposite sides of the rotor wall 10, and substantially parallel to the latter. The connection between each pin and the brake shoe may be of any suitable character, but preferably permits a slight rocking of the shoe so that uniform engagement of the entire length of the shoe with the brake drum may be secured. Merely as an example of such a connection each pin may have a collar 16 for engagement with the side of the shoe, and against one side wall of the shoe. This collar may be formed integral with the pin. Between the side walls of the shoe the pin may have a second collar 17 held against longitudinal movement in one direction by a cotter pin 18. This collar is held against the cotter pin by a spring 19 which serves not only to hold the brake shoe against the collar 16, but prevents rattling due to lost motion endwise of the pin or about the pin as a center.

The two pins 14 and 15 are mounted in a member which has certain freedom of movement in a direction at an angle to the wall 10 of the rotor. As shown, this member is in the form of an arm 20 pivoted on a pin 21 which may be carried by any suitable form of support, as for instance a bracket 22 clamped to some non-rotary part coaxial with the rotor. The pin 21 is preferably disposed adjacent to the periphery of the brake drum and the arm extends in a direction approximately tangential to the drum so that the swinging of the arm moves the pins 14 and 15 toward and from the wall 10 and approximately radially of the rotor.

As the arm 20 is free to swing to bring either shoe into engagement with the brake drum, it will be apparent that upon moving either shoe toward the other the spacing between the shoes will be reduced and the brake drum may be gripped by the simultaneous and equal action of the two shoes.

For the same reason the normal spacing between the shoes may be varied by the movement of either shoe toward the other. This permits adjustment to take care of wear and resulting variation in the thickness of the brake shoe linings. In practice I provide means for moving one shoe to secure normal spacing for released position, and provide means for moving the other shoe in applying the brake. The movement of the shoes is preferably accomplished by providing the pins 14 and 15 with eccentric portions and means for rotating them. As shown, each pin has the shoe supporting end eccentric in respect to the end journaled in the arm 20. Thus by rotating either pin the shoe carried thereby is moved toward or from the brake drum. The pin for the outer shoe 11 is normally rigidly clamped against rotation in the arm 20, but can be rotated to adjust the normal spacing between the shoes. As shown the arm has a split bearing for the pin 14 and a pair of clamping bolts 23 which may be tightened to lock the pin against rotation. The outer end 24 of the pin may be provided with flattened faces whereby it may be readily engaged by a wrench to turn the pin when the bolts 23 are loosened.

The other pin 15 has a similar shoe bearing portion eccentric in respect to the portion journaled in the arm 20. The outer end 25 of this pin may be provided with a lever 26 or other means for rotating the pin to apply the brakes.

Due to the fact that the lever arm 26 is very long compared to the eccentricity of the shoe bearing portion of the pin 15, it will be apparent that a comparatively light pull on the lever arm will exert great pressure on the brake shoe to grip the brake band and resist or prevent rotation of the latter.

As the brake linings wear to lesser thickness the lever arm 26 must be moved to a greater distance to apply the brake, but this can be readily compensated for by adjustment of the brake shoe 11 toward the brake shoe 12 to restore the normal or original spacing of the brake shoes.

If the parts be positioned as shown in Fig. 1, the inner shoe 12 will be entirely free from the brake drum when the brake is released, and the outer brake shoe 11 will ride very lightly on the brake drum. Frictional resistance offered by this riding of the shoe is practically nil, due to the fact that the direction of movement of the shoe toward the drum has a very decided horizontal component. By adjusting the bracket 22 so that the centers of the shoes come at a lower point than is shown in Fig. 1, the brake drum may be entirely relieved of any weight of the shoes when the brake is released. As the shoes extend along less than one-half the circumference of the drum, it will be apparent that a second pair of shoes may be mounted diametrically opposite to the pair shown and operated entirely independently thereof, or in conjunction therewith. If the brake is used on a vehicle, one pair of brake shoes may serve for the foot brake and the other for an emergency brake.

As one important advantage of my construction the pivotal mounting of the brake shoe carrying arm 20 permits the latter to swing during rotation of the brake drum and accommodate itself to any non-cylindrical construction or mounting of the brake drum. For instance the brake drum may be quite markedly eccentric in respect to its axis of rotation, but this will not interfere with the proper application of the brakes or the complete release of the brakes as the two shoes merely ride along the drum and move in and out with variations in the contour of the latter. By avoiding the necessity of accurately turning and accurately mounting the brake drum, I secure a very decided reduction in the cost of manufacture and installation of the apparatus. Furthermore there is no binding or failure of proper operation, should the brake drum expand upon undue heating, or in case of contraction from severe cold.

There are practically no parts in the entire device which require any machining operations except the pins 14, 15 and 21, and the journals for the latter.

By the term "brake shoes" as used in the foregoing specification and in the claims, I do not wish to imply that the invention is limited in its use solely to resisting or preventing the rotation of a rotor. The brake shoes are clamping members, and when engaged with the drum resist or prevent relative rotation of the drum and the part carrying the shoes. Many features of my improved construction are equally applicable for use in a clutch for connecting one rotatable member to a drum forming the other rotatable member.

Having thus described my invention, what I claim as new and desire to secure by Letters Patent is:

1. The combination with a rotor of a member having a portion freely movable in a direction at an angle to the surface of the rotor, a pair of brake shoes carried by said member upon opposite sides of the rotor, and means for moving one only of the shoes with respect to the member toward the other to apply both brake shoes.

2. The combination with a rotor of a member having a portion freely movable in a direction at an angle to the surface of the rotor, a pair of brake shoes carried by said member upon opposite sides of the rotor, and means for moving one only of the shoes toward the other to adjust the normal spacing of the shoes.

3. The combination with a rotor of a member having a portion freely movable in a direction at an angle to the surface of the rotor, a pair of brake shoes carried by said member upon opposite sides of the rotor, and a pin rotatably mounted in said member and having an eccentric portion for moving one of said shoes toward the other.

4. The combination with a rotor of a member having a portion freely movable in a direction at an angle to the surface of the rotor, a pair of brake shoes carried by said member upon opposite sides of the rotor, a pin rotatably mounted in said member and having an eccentric portion for moving one of said shoes toward the other, and an operating lever for rotating said pin to apply both brake shoes to the rotor.

5. The combination with a rotor of a member having a portion freely movable in a direction at an angle to the surface of the rotor, a pair of brake shoes carried by said member upon opposite sides of the rotor, a pin rotatably mounted in said member and having an eccentric portion for moving one of said shoes toward the other, and means for normally locking said pin against rotation.

6. The combination with a rotor of a member having a portion freely movable in a direction at an angle to the surface of the rotor, a pair of brake shoes carried by said member upon opposite sides of the rotor, means for moving one of said shoes toward and from the other to vary the normal spacing, and means for moving the other shoe toward and from the first mentioned one to grip the rotor between said shoes.

7. The combination with a rotor of a member having a portion freely movable in a direction at an angle to the surface of the rotor, a pair of brake shoes carried by said member upon opposite sides of the rotor, and a pair of pins journaled in said member and having eccentric portions serving as pivotal supports for said shoes.

8. The combination with a rotor of a member having a portion freely movable in a direction at an angle to the surface of the rotor, a pair of brake shoes carried by said member upon opposite sides of the rotor, a pair of pins journaled in said member and having eccentric portions serving as pivotal supports for said shoes, and operating means connected to one only of said pins for rotating the latter to apply both brake shoes to the rotor.

9. The combination with a rotor of a member having a portion freely movable in a direction at an angle to the surface of the rotor, a pair of brake shoes carried by said member upon opposite sides of the rotor, an eccentric normally locked against rotation, but rotatable to adjust the position of one shoe, and an eccentric for moving the other shoe to grip the rotor between the shoes.

10. The combination with a rotor of a pair of brake shoes having their surfaces disposed substantially parallel to the surface of the rotor, and upon opposite sides thereof, a pair of eccentric pins for supporting the brake shoes, and means for rotating one of said pins to effect relative movement of the brake shoes toward or from each other.

11. The combination with a rotor of a pair of brake shoes having their surfaces disposed substantially parallel to the surface of the rotor, and upon opposite sides thereof, a pair of eccentric pins for supporting said brake shoes, means for rotating one of said pins to bring the brake shoes toward each other, and means for normally locking the other pin against rotation.

12. The combination with a cylindrical brake drum of an arm pivotally mounted adjacent to the periphery and extending in a general tangential direction, a pair of shoes having spaced approximately parallel surfaces, one inside of and the other outside of the drum, means for pivotally connecting one shoe to said arm with a normally fixed pivotal center, means for pivotally connecting the other shoe to said arm, and means for moving the pivotal center of the second mentioned shoe to bind the drum between the shoes.

13. The combination with a cylindrical brake drum of an arm pivotally mounted adjacent to the periphery and extending in a general tangential direction, a pair of shoes having spaced approximately parallel surfaces, one inside of and the other outside of the drum, an eccentric for adjusting one of said shoes radially of the drum and in respect to said arm, and an operating lever supported by said arm and connected to the other of said shoes for moving it substantially radially to grip the brake drum between the shoes.

14. The combination with a cylindrical brake drum of an arm pivotally mounted adjacent to the periphery and extending in a general tangential direction, a pair of shoes having spaced approximately parallel surfaces, one inside of and the other outside of the drum, a pair of pins carried by said arm and having eccentric portions for supporting said shoes, and means for rotating one of said pins to grip the brake drum between the two shoes.

15. The combination with a rotor of a member having a portion freely movable in a direction at an angle to the surface of the rotor, a pair of brake shoes carried by said member upon opposite sides of the rotor, and means for effecting a relative movement of said shoes toward and from the sides of the rotor, said member permitting limited floating movement of the two brake shoes to permit equal gripping action against opposite sides of said rotor.

16. The combination with a rotor of a member having a portion freely movable in a direction at an angle to the surface of the rotor, a pair of brake shoes upon opposite sides of the rotor, a pair of pivot pins carried by said member and supporting said brake shoes and disposed substantially parallel to each other and to the surface of the rotor, and means for moving said pivot pins to engage said brake shoes with said rotor, said member permitting limited radial floating movement of the brake shoes to insure equal gripping action of the latter on said rotor.

17. The combination with a cylindrical brake drum of an arm pivotally mounted adjacent to the periphery and extending in a general tangential direction, a pair of brake shoes having approximately parallel surfaces, one on the inside and the other on the outside of the drum, and an operating lever pivotally connected to said arm adjacent to the outer end of the latter for effecting movement of said brake shoes in respect to said drum, the freedom of movement of the arm permitting the equal gripping action of the shoes on said brake drum.

18. In combination a pair of relatively rotatable members, one including an annular section and the other having a pair of shoes upon opposite sides of said section, a pair of pivot pins supporting said shoes and disposed parallel to each other and to the surfaces of said section, and means for moving said pivot pins to engage said shoes with said section, and a support for said pivot pins permitting limited floating movement of said shoes to insure equal gripping action of the latter on said section.

19. The combination with a rotor of a member having a portion freely movable in a direction at an angle to the surface of the rotor, a pair of brake shoes mounted for oscillation on said member and positioned on opposite sides of the rotor, and means for moving the center of oscillation of one of said shoes with respect to said member to apply both shoes to the rotor.

20. The combination with a rotor of a member pivotally mounted at a point fixed with respect to the rotor, the free end of said member being adapted to swing at an angle to the surface of the rotor, a pair of brake shoes carried by said member at its free end and upon opposite sides of the rotor, and means for moving the shoes toward each other to apply them to the rotor.

21. The combination with a rotor of a support mounted to swing freely in a direction at an angle to the surface of the rotor, a pair of brake shoes carried by the said support at its free end and upon opposite sides of the rotor, and means for moving one only of the shoes toward the other to apply them to the rotor.

Signed at New York, in the county of New York and State of New York, this 24th day of January, A. D. 1925.

RALPH H. ROSENBERG.